United States Patent [19]

Kimura et al.

[11] Patent Number: 4,552,708
[45] Date of Patent: Nov. 12, 1985

[54] METHOD FOR PRODUCING CROSSLINKED FOAM

[75] Inventors: Takao Kimura; Yoshinobu Nagaoka, both of Ami, Japan

[73] Assignee: Mitsubishi Petrochemical Co., Ltd., Tokyo, Japan

[21] Appl. No.: 541,840

[22] Filed: Oct. 14, 1983

[51] Int. Cl.[4] .......................... B29D 27/00; B29F 3/04
[52] U.S. Cl. ................................... 264/53; 264/54; 264/177 R; 264/338; 264/DIG. 13; 264/DIG. 18; 425/97; 425/325; 425/817 C
[58] Field of Search .............. 264/53, 46.1, 45.9, 264/54, DIG. 18, 338, 177 R, DIG. 13; 425/97, 325, 817 C

[56] References Cited

U.S. PATENT DOCUMENTS

| 2,537,977 | 1/1951 | Dulmage | 264/53 |
| 3,030,623 | 4/1962 | Lehti et al. | 264/46.1 |
| 3,928,525 | 12/1975 | Fuwa et al. | 264/174 |
| 4,071,591 | 1/1978 | Kobayashi et al. | 264/54 X |
| 4,483,815 | 11/1984 | Torghele | 425/97 X |

FOREIGN PATENT DOCUMENTS 45-29381 9/1970 Japan .
58-1531 1/1983 Japan .

OTHER PUBLICATIONS

Toyo Seiki Seisaku-sho Brochure: "Standard Geer Type Aging Tester", Tokyo, Japan, Toyo Seiki Seisaku-sho, Ltd., Jun. 1983, 8 pages.

*Primary Examiner*—Philip Anderson
*Attorney, Agent, or Firm*—Armstrong, Nikaido, Marmelstein & Kubovcik

[57] ABSTRACT

A method for producing a crosslinked, uniformly expanded article of thermoplastic resin is provided.

Thermoplastic resin containing a crosslinking agent and a foaming agent is extruded through a long-land die which is provided with a choking orifice at an end and/or an intermediate portion thereof; a lubricant is provided on the inner surface of the long-land die; the crosslinking agent is decomposed in the long-land die to lower the flow rate of the resin and the foaming agent is decomposed or heated to its boiling point in the long-land die to provide an expandable resin and the crosslinked, expandable resin is then released into an atmospheric or controlled pressure zone to produce the uniform, finely expanded article.

16 Claims, 8 Drawing Figures

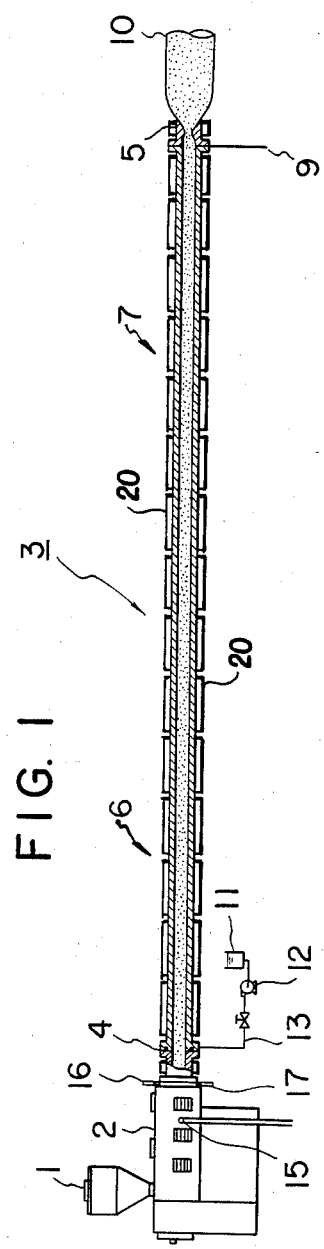
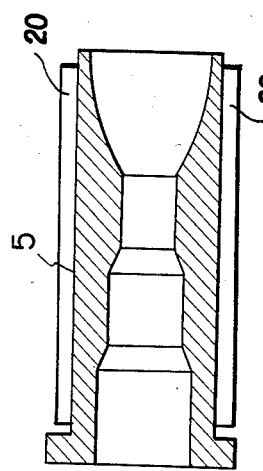
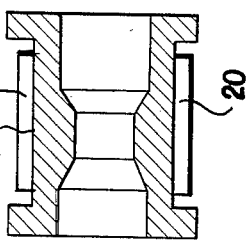
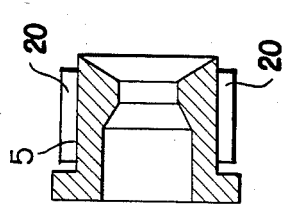
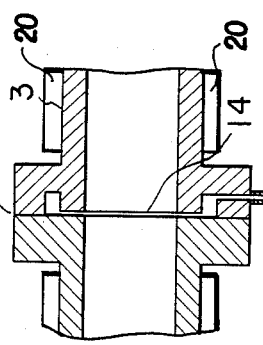
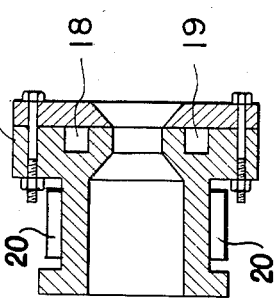

METHOD FOR PRODUCING CROSSLINKED FOAM

TECHNICAL FIELD

This invention relates to a method for producing crosslinked foam articles and more particularly to an extruding-forming method which produces uniformly expanded crosslinked foam articles having low to high expansion rates; especially crosslinked foam articles having thick cross-sections.

BACKGROUND ART

Heretofore, various methods for producing foamed thermoplastic articles by continuous extrusion have been known. As for the foaming agent, both physical agents which volatilize by heating and chemical agents which decompose and generate gas by heating have been used.

However, it has been difficult to obtain uniform, fine-celled, highly expanded foam from thermoplastic resins because such resins sharply decrease in viscosity with heating and melting.

In order to avoid this defect, a crosslinking-foaming process wherein a thermoplastic resin is crosslinked to adjust its melt viscosity to a desired degree for foaming has been offered. For example, a thermoplastic resin comrising a chemical foaming agent and a crosslinking agent which has a lower decomposition temperature than the chemical foaming agent is formed into a desired shape. The shaped article is heated at atmospheric pressure or under controlled pressure, firstly, to cause crosslinking by decomposition of the crosslinking agent and, secondly, to cause expansion of the resin by decomposition of the chemical foaming agent.

An atmospheric pressure, rapid foaming causes foaming of only the surface portion of the article. The foamed surface portion acts as an insulation layer and prevents thermal conduction to an inner portion of the resin and the chemical foaming agent cannot decompose smoothly. Even if a resin compound is heated slowly, decomposition of a chemical foaming agent in the innermost portion of an article thicker than 10 mm is difficult.

Accordingly, the upper limit of the thickness of such a foamed article is about 20 mm and a foamed article thicker than 20 mm is usually made by lamination.

On the other hand, for the production of crosslinked foamed articles under pressure there are known a batchwise method and a continuous method. In the batchwise method, as described in the Japanese Patent Publication No. 29381/70 (Yoshida et al), a thermoplastic resin compound comprising a crosslinking agent and a foaming agent is heated in a mold through one step or two steps to cause crosslinking and foaming of the resin. In this process, even though thick, uniform, fine-celled, foamed articles can be obtained, productivity remains low due to the use of a batchwise system.

In the continuous method, Japanese patent Publication No. 1531/83 (Matsui et al) shows a method for foaming a polyolefin in which a polyolefin containing an organic peroxide and foaming agent is extruded into a long-land die, formed into a tubular shape, crosslinked and exposed to a lower pressure zone than in the long-land die to cause expansion. This process uses an oil lubricating method as described in U.S. Pat. No. 3,928,525 (Matsui et al) in which a thermoplastic resin is crosslinked in a long-land die and extruded continuously therefrom. In this process, however, bubbles which are generated from the foaming agent cause thermal conduction to an inner portion of the resin to become low and prevent uniform crosslinking.

Many kinds of foaming agents normally used in a crosslinking-foaming process may generate bubbles in a resin by volatilizing or decomposing partially during crosslinking to decrease the flow rate of the resin and, as the result, to decrease thermal conduction and retard the crosslinking reaction. If bubbles are generated in a resin before the flow rate of the resin becomes sufficiently low due to crosslinking, the dimensions of cells in the finally produced foamed article are extremely nonuniform.

The present invention has been made to overcome the aforesaid problems in the prior art. An object of this invention is to provide a method for producing a crosslinked foamed article in which, even in a thick article, uniform expansion can be achieved in the innermost portion.

Another object of this invention is to provide a method for producing a foamed article having a uniform, fine cell structure at high and low expansion rates.

Another object of this invention is to provide a method for making such a crosslinked foamed article which has high productivity.

DISCLOSURE OF INVENTION

According to the present invention, these and other objects are achieved by a method comprising: extruding a crosslinkable thermoplastic resin containing a foaming agent and a crosslinking agent into a long-land die wherein at an end portion and/or an intermediate portion of the long-land die a choking orifice is provided; feeding a lubricant into the inner surface of the long-land die; heating the resin to cause crosslinking and decreasing of the melt flow rate of the resin by decomposition of the crosslinking agent; and thereafter expanding the resin by decomposition of the foaming agent. By providing a choking orifice at an end or intermediate portion of the long-land die, the resin in the long-land die is subjected to a back pressure. Separation of gas generated from the foaming agent is thereby prevented and homogeneous dissolving of the gas into the resin occurs during the process of crosslinking. Releasing of the resin from the long-land die into a lower pressure zone results in a uniformly, finely foamed article being obtained.

By the method of the present invention, thick and finely foamed articles of high to low expansion rates can be made with high productivity and at an unpredictably improved extruding speed.

BRIEF DESCRIPTION OF DRAWINGS

In the drawings of this application:

FIG. 1 is a side view, partly in section, of an apparatus for carrying out the method of the invention, FIG. 2 is a sectional view of a lubricant applicator used in the method of the invention, FIGS. 3, 4 and 5 are sectional views of choking orifices used in the method of the invention, FIG. 6 is a sectional view of an intermediate choking orifice used in the method of the invention.

MODES FOR CARRYING OUT THE INVENTION

Figure 7:
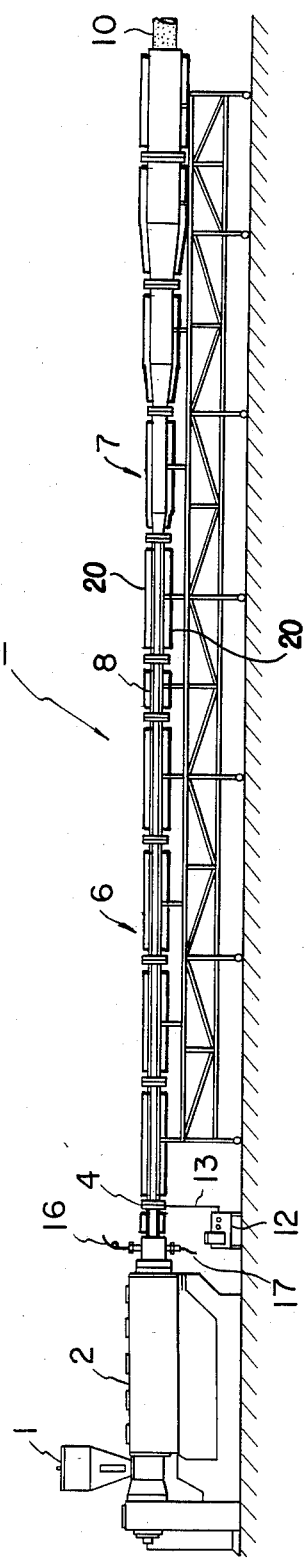
FIG. 7 is a side view of an apparatus for carrying out another embodiment of the method of the invention.

Crosslinkable thermoplastic resins useful in the method of the present invention are not particularly limited and include high density and low density polyethylene, polystyrene, polypropylene, polyvinylchloride, polyamide and copolymers in which the aforesaid polymers are present in a predominant amount such as, for example, ethylene-propylene copolymer, ethylene-vinylacetate copolymer and mixtures of these polymers and copolymers. Elastomers such as EPR, EPDM, SBR, IIR and rubber can be used also. Furthermore, the thermoplastic resins can contain various additives such as parrafin, another thermoplastic resin, plasticizer, pigment, flame retardant agent, antistatic agent and stabilizers as will be appreciated by those skilled in the art.

Polyolefins and other crystalline thermoplastic resins have particular utility in the method of the invention and can be made into crosslinked foamed articles having uniform fine cells and low to high expansion rates. Moreover, even high density polyethylene and polypropylene which are not widely used in the prior art methods can be made into thick crosslinked foamed articles.

Crosslinking agents which can be used in this invention include any of those agents suitable for crosslinking the thermoplastic resins and which have a higher decomposition temperature than the melt initiating temperature of the resin.

Typical crosslinking agents are, for example, organic peroxides such as ditertiarybutyl peroxide, tertiarybutylcumyl peroxide, dicumyl peroxide, $\alpha,\alpha$-bis(-tertiarybutyl peroxy diisopropyl)benzene, 2,5-dimethyl-2,5-di(tertiarybutyl peroxy)hexane, 2,5-dimethyl-2,5-di(tertiarybutyl peroxy)hexene-3 or mixtures thereof and sulfur. If desired, a retarder or an accelerator for crosslinking can be added as an auxiliary agent.

The "decomposition temperature" of the crosslinking agent means the temperature at which the half-life period of the agent becomes one minute. The quantity of crosslinking agent used should be determined according to various factors such as molecular weight, molecular weight distribution, extent of branching of the resin used, degree of crosslinking desired and the decomposition temperature of the crosslinking agent. Usually the quantity of the crosslinking agent is 0.1-5 wt %, and, preferably, 0.2-2 wt % based on the weight of the crosslinkable thermoplastic resin composition.

If the amount of crosslinking agent used is less than 0.1 wt %, lowering of the melt flow rate of the resin, especially of a crystalline thermoplastic resin, by crosslinking is insufficient and, as a result, it is difficult to make a thick crosslinked foam article having a uniform cellular structure. On the other hand, when more than 5 wt % of a crosslinking agent is used, the melt flow rate is reduced excessively in the extruder whereby a uniform cellular structure of the crosslinked foamed article is difficult to obtain.

As the foaming agent in the method of this invention, virtually any volatile physical foaming agent or chemical foaming agent which generates gas such as nitrogen, carbon dioxide or ammonia by decomposition can be used. Volatile physical foaming agents include aliphatic hydrocarbons, for example, butane, pentane, hexane, heptane and halogenated aliphatic hydrocarbons such as methyl chloride, methylfluoride and tetrafluoroethylene. As for chemical foaming agents, the decomposition temperature should be higher than that of the crosslinking agent or agents used. For example, azodicarbonamide, dinitriso-pentamethylene tetramine, azobisisobutyronitrile and p,p-oxybis-benzenesulfonylhydrazide can be used. These foaming agents can be used as mixture of two or more than two kinds of agents and various kinds of auxiliary agents can be added as will be understood by those skilled in the art.

The method of the present invention can be better understood by referring to the accompanying drawings which are schematic representations of specific embodiments of apparatus useful in carrying out the method of the invention.

In FIG. 1, a crosslinkable thermoplastic resin containing a crosslinking agent and a foaming agent is fed into hopper 1 of extruder 2 and mixed and kneaded in the extruder at a temperature where there is no substantial decomposition of said crosslinking agent and foaming agent and then is extruded into long-land die 3. A thermometer, or thermocouple 16, and a pressure guage 17, are provided at the outlet of the extruder 2 to measure the resin temperature and pressure. At a position adjacent to the entrance of the long-land die, lubricant applicator 4 is provided to supply lubricant to the inner surface of the long-land die 3.

An example of a lubricant applicator is shown in FIG. 2. Lubricant applicator 4 is provided with slit 14 in its inner surface and conduit pipe 13 which is connected to feeding pump 12 and lubricant reservoir 11. Lubricant can be fed and spread through slit 14 into the interface between the inner surface of the long-land die and the surface of the resin being extruded forming a continuous film of lubricant.

As crosslinking of a resin by decomposition of a crosslinking agent progresses, the flowability of the resin decreases and friction of the resin increases and finally it becomes very difficult to form the resin into a desired shape and damage of an extruder may occur. The lubricant fed through applicator 4 eliminates this problem and makes it possible for the crosslinked resin to flow smoothly through the long-land die.

As the lubricants which can be employed in the present invention, chemically stable substances which do not decompose, boil, accelerate degradation of the thermoplastic resin and which are not soluble in the resin are preferred. For example, polysiloxanes such as polydimethylsiloxane and polymethylsiloxane, polyhydric alochols and their alkylesters and their alkylethers, and polyoxyalkylenes and their derivatives such as random, block or graft copolymers of two or more alkylene oxides can be used. Preferably, a water soluble surfactant such as a polyhydric alcohol is recommended because the lubricant can easily be removed from the surface of the foamed article by washing.

In the body of the long-land die, a heater 20 which heats the resin at a controlled temperature; preferably, an electrical band heater, is provided.

Crosslinkable thermoplastic resin extruded into long-land die 3 is substantially crosslinked in the front or upstrean part 6 of long-land die 3 by heating under pressure. In the rear or downstream part 7 of the long-land die 3, the foaming agent is decomposed to generate gaseous material such as $N_2$ or $CO_2$.

At the end of long-land die 3, a choking orifice 5 is provided so as to provide back pressure on the resin in long-land die 3 and to prevent formation of bubbles in the resin due to generated gas. From the outlet of choking orifice 5 crosslinked resin containing gas dissolved therein under pressure is released into an atmospheric or controlled pressure zone so as to give a thick, uniformly expanded crosslinked foam article.

In front or upstream part 6 of long-land die 3, the crosslinking agent is decomposed at a temperature lower than the decomposition temperature of the foaming agent to cause the thermoplastic resin to crosslink and to thereby decrease the melt flow rate of the resin.

The degree of crosslinking of the resin is measured for example by dissolving the resin in boiling xylene. In the present invention, the gel ratio which is defined by the weight % of residue gel which remains undissolved after a 10 hour extraction by boiling xylene is more than 5% and, preferably 10–70%, whereby the viscosity of the resin is adjusted suitably and almost all of the gas generated from the foaming agent can be effectively utilized for expansion.

The length of the long-land die is determined by parameters such as resin temperature, forming speed, heat conductivity of the resin and decomposing characteristics of the crosslinking agent. Usually the length of front or upstream part 6 is more than 50 cm, preferably more than 200 cm. With a long-land die shorter than 50 cm it is difficult to obtain a uniform cellular article. The optimum length of the die should be determined by taking into account the production rate and economical factors such as cost of installation or utilities.

Downstream of the front or upstream part 6, the resin is heated to a higher temperature in the rear part 7 of long-land die 3 where the foaming agent is decomposed. Gas generated by decomposition of the foaming agent remains in the resin substantially unseparated therefrom by dissolving or by absorbing under the back pressure caused by choking orifice 5 mounted at the end of long-land die 3.

The melted and gas-containing crosslinked resin is then released continously into an atmospheric or controlled pressure zone to expand and to give a uniform, fine cellular foamed article 10.

Length of the rear or downstream part 7 of the long-land die 3 necessary to provide decomposition of the foaming agent by heating is preferably 1/5–2 times the length of the front or upstream part 6.

The temperature of the long-land die, especially rear or downstream part 7, is preferably gradually increased toward the end portion of the die to ensure a uniform, fine cellular structure in both the surface and inner portions of the foamed article.

Choking orifice 5 mounted at the end of long-land die 3 must have a choking ratio sufficient to provide a back pressure which keeps gas derived from the foaming agent dissolved in the resin and to prevent formation of bubbles. Practically, a ratio of vertical cross-sections A/B in the range of 10/9 to 10/1, and preferably 10/7 to 10/2, is provided, wherein A is the area of flow of a vertical cross section (internal) of the rear or downstream part of the long-land die and B is the area of flow of the narrowest section of the choking orifice. Choking orifice 5 can contain plural choking sections. Illustrative examples of such choking orifices are shown in FIG. 3, 4 and 5.

In case that lubricant accumulates in front of choking orifice 5, drainer 9 may be mounted in front of choking orifice 5. Drainer 9 has, for example, a slit surrounding the inner surface of the die and is connected to an exhausting pipe.

As shown in FIG. 5, choking orifice 5 may also have passways 18 and 19 provided for cooling water in order to increase the back pressure by slightly cooling the resin at that point.

Certain types of foaming agents may have a tendency to decompose and generate bubbles at a temperature for crosslinking thereby reducing thermal conduction and impeding smooth crosslinking of the resin. In such cases, an intermediate choking orifice may preferably be provided at a portion (not shown in FIG. 1) of the long-land die where a desired degree of crosslinking is to be achieved. Said intermediate choking orifice creates back pressure sufficient to keep the gas resulting from decomposition of the foaming agent dissolved in the resin. An illustrative example of an intermediate choking orifice 8 is shown in FIG. 6.

A choking orifice mounted at the end of a long-land die must provide back pressure which is high enough to keep gas from essentially all of the foaming agent necessary for expansion dissolved in resin. On the other hand, an intermediate choking orifice is mounted at a portion between the front or upstream part and rear or downstream part of the long-land die and back pressure to be provided by the intermediate choking orifice is required to dissolve gas resulting from only partial decomposition of the foaming agent during crosslinking. Hence The back pressure to be caused by an intermediate choking orifice is far lower than that of a choking orifice provided at the end portion of the die. When providing an intermediate choking orifice, a choking orifice at the end portion of the die can have a lower choking ratio or even be eliminated.

Figure 8:
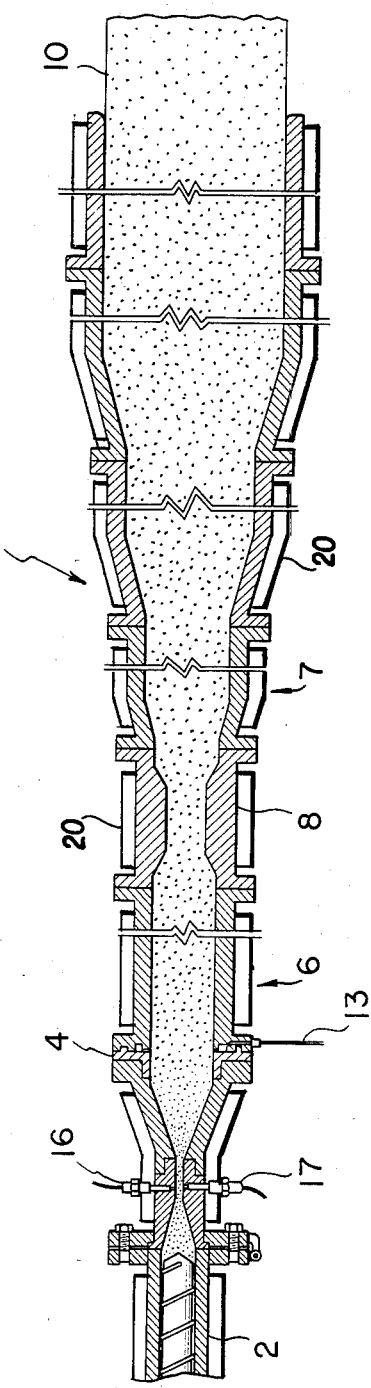
FIG. 8 is an enlarged sectional view of the apparatus shown in FIG. 7.

Another embodiment for producing a crosslinked foamed article according to the method of the present invention using an intermediate choking orifice is illustrating in FIGS. 7 and 8. Referring to these figures, an intermediate choking orifice 8 is provided at a portion between front or upstream part 6 and rear or downstream part 7 of long-land die 3. In front or upstream 6, the resin is crosslinked by decomposing the crosslinking agent at a temperature lower than the decomposition temperature of the foaming agent under the pressure created by the intermediate choking orifice. In this state, many of the usual foaming agents have a tendency to partially decompose and form bubbles. In the method of the present invention, however, the back pressure derived from the intermediate choking orifice allows smooth crosslinking to be achieved and formation of bubbles in the resin to be suppressed. The choking ratio A/B of the intermediate choking orifice can be determined experimentally and, typically, is in the range of 10/9 to 10/1, and more typically, 10/7 to 10/2, wherein A is the area of a vertical cross section (flow) of the front or upstream part of the long-land die and B is the area of the narrowest section, i.e., maximum choking portion, of the intermediate choking orifice.

Two or more than two intermediate orifices which have a lower choking ratio can be used in combination to achieve the same back pressure as the single intermediate orifice described above.

In rear or downstream part 7 of long-land die 3, the resin is heated gradually by means of heater 20 to the temperature where the foaming agent decomposes and thereafter the resin is expanded into a uniform, fine cellular foamed article.

As shown in FIGS. 7 and 8, rear or downstream part 7 of long-land 3 is preferably configured in a funnel form in which the cross section of the die is gradually enlarged so as to maintain slight pressure on the expanding resin. Most preferably, when the expansion ratio of the resin is more than ten, a die configuration which is arranged to absorb the voluminous expansion stepwise as shown in FIG. 8 is recommended.

When physically volatile foaming agents such as butane, pentane, methyl chloride or methylfluoride are used, the agent is added to the resin through inlet 15 provided on the side of extruder 2 as shown in FIG. 1. After kneading and mixing with the resin to form a homogeneous mixture, the mixture is extruded into long-land die 3. In order to substantially suppress the formation of bubbles in front or upstream part 6 of the long-land die where crosslinking occurs, back pressure is provided by choking orifice 5 as in the embodiment of FIG. 1 or by an intermediate choking orifice 8 as in the embodiment of FIGS. 7 and 8.

According to the present invention, a uniformly expanded, fine-cell foamed article having a low or high expansion ratio, even in a thick article, can be obtained in a continuous process. Notwithstanding the use of a long-land die, the extruding rate of the foamed article is increased over the methods of the prior art, contrary to expectations. Even when the method of the present invention is applied to crystalline polyolefins, which have been deemed to be impossible to form into uniform, fine foamed articles, particularly high density polyethylene and polypropylene, finely foamed articles of a high expansion rate can be obtained.

The following examples are presented to further illustrate the method of the present invention.

EXAMPLE 1

Pelletized particles consisting of 100 parts by weight of low density polyethylene (Mitsubishi Petrochemical Co., LK50) and 7 parts by weight of foaming agent (Eiwa Kasei Co., AC#3), together with 1.0 part by weight of crosslinking agent (Nippon Oil & Fats Co., Percumyl D), were fed into an extruder 2 as shown in FIG. 1. Extruder 2 was heated by an electric heater provided outside of the cylinder. Resin was extruded into long-land die 3 having a circular cross section of 21 mm in diameter at an extrusion rate of 5 kg/hr. A thermometer 16 for determining resin temperature mounted at the outlet of extruder 2 indicated 162 C.

Lubricant (Nippon Oil & Fats Co., Nissan Unilube 75D-2620) was supplied constantly from lubricant applicator 4 to the inner surface of front or upstream part 6 of long-land die 3, and was spread in the interface between the die and the resin forming a continuous film of lubricant.

The front or upstream part 6 of the long-land die was 2 m long, and the die temperature was gradually raised along the direction of resin flow up to 175° C. Subsequently, at the rear or downstream part 7 which was 1 m long, the die temperature was gradually raised along the direction of resin flow up to 202° C. in order to decompose the foaming agent. At the end of long-land die 3 an oil drainer 9 and a choking orifice 5 were provided. A choking orifice having a configuration shown in FIG. 3 was provided to give a back pressure sufficient to dissolve gas generated by decomposition of the foaming agent into the resin. The choking ratio A/B (defined above) was 4/1. A pressure gauge 17 mounted at the outlet of extruder 2 indicated 35 kg/cm$^2$.

Melted and crosslinked resin was continuously released from choking orifice 5 into an atmospheric zone and expanded into a continuous foamed article 10.

The foamed article 10 according to this example was a cylindrical rod having a diameter of about 3.8 cm, a density of 0.065 g/cc and having a uniform, fine cellular structure in which the cell size was smaller than 200 microns.

COMPARATIVE EXAMPLE 1

In a process carried out according to Example 1, the lubricant supply was stopped. A pressure gauge for resin 17 started to show a pressure higher than 35 kg/cm$_2$ while the exrusion rate decreased. Finally, 10 minutes after the lubricant supply was ceased, extrusion became completely impossible.

COMPARATIVE EXAMPLE 2

In a process carried out according to Example 1, choking orifice 5 at the end portion of the long-land die was omitted. Only an outer surface portion having a thickness of 5 mm was foamed coarsely; the inner portion of the article remained unexpanded.

EXAMPLE 2

Pelletized resin consisting of 100 parts by weight of ethylene-vinylacetate copolymer (Mitsubishi Petrochemical Co., EVA-20K) and 5 parts by weight of foaming agent (AC#3), together with 0.8 part by weight of crosslinking agent (Percumyl D), was treated according to same procedure as described in Example 1. A cylindrical foamed article having a diameter of about 3.5 cm and a density of 0.097 g/cc, and having fine cells smaller than 200 microns was obtained.

EXAMPLE 3

Using an extruder 2 as shown in FIG. 1, resin consisting of 100 parts by weight of high density polyethylene (Mitsubishi Petrochemical Co., JX20, density 0.963 g/cc) homogeneously mixed with 10 parts by weight of foaming agent (AC#3) and 0.8 part by weight of crosslinking agent (Nippon Oil & Fats Co., Perhexine 2-5 B) was processed through extruder 2, 3 m of a front or upstream part die 6 heated up to 175° C. and 1 m of a rear or downstream part die 7 heated up to 202° C. and having a diameter of 21 mm. Resin thermometer 16 indicated 167° C. and the resin pressure gauge showed 56 kg/cm$^2$. Choking orifice 5 was provided with cooling water passways as illustrated in FIG. 5 and its choking ratio A/B was 4/3.

A foamed article 10 thus obtained had a diameter of 45 mm, a density of 0.0536 g/cc, and a 65% gel ratio and had uniform, fine cells smaller than 200 microns.

This crosslinked foamed article was heated in a Geer oven, which provides hot air blowing at 120° C., for 15 hours. No dimensional change was observed except slight dulling or rounding of the edges.

EXAMPLE 4

This example was carried out using an apparatus as shown in FIGS. 7 and 8.

100 parts by weight of high density polyethylene (JX20) and 15 parts by weight of foaming agent (AC#3) were uniformly mixed and pelletized through an extruder to make a master batch. 35 parts by weight of the master batch, 65 parts by weight of high density polyethylene (Mitsubishi Petrochemical Co., EY40c) and 0.6 parts by weight of crosslinking agent (Perhexine 2-5

B) were fed into extruder 2 as shown in FIG. 8 and extruded and formed through long-land die 3.

The length of long-land die 3 was 6.2 m in which front part 6 was 3.5 m, intermediate choking orifice 8 was 0.2 m and rear part 7 was 2.5 m. The rear or downstream part 7 was further divided into four portions and the cross sections were enlarged in three steps. The vertical cross section of the long-land die was rectangular and the dimension of the cross section of each portion was as follows: front or upstream part 6 was 20×100 mm; intermediate choking orifice 8 at the narrowest section was 15×75 mm; the first rear or downstream portion was 26×130 mm; the second rear or downstream portion was 32×160 mm; and the third rear or downstream was 40×200 mm. From lubricant applicator 4, lubricant was constantly supplied into the inner surface of front or upstream part 6 long-land die 3 as described in Example 1. Resin temperature was 164° C. at the outlet of extruder 2, 171° C. at the end of front or upstream part 6 and 190° C. at the end of rear or downstream part 7. Pressure gauge 17 mounted at the end of extruder 2 indicated 72 kg/cm².

The thus obtained crosslinked foamed article was a continuous board having a rectangular cross section of 42×210 mm, a density of 0.0875 g/cc and uniform, fine cells smaller than 200 micron. The gel ratio of this material was 42%. By slicing this foamed board using a band saw, 3 mm thick, flexible foamed sheets were obtained.

EXAMPLE 5

100 parts by weight of low density polyethylene (LK50) and 1.0 part by weight of crosslinking agent (Percumyl D) were mixed and fed into an extruder 2 as shown in FIG. 1. A foaming agent inlet 15 was provided on the side of extruder 2 at a point about ⅔ of the length of the extruder from hopper 1. From inlet 15 butane was charged under pressure into the resin at a rate of 4 parts by weight of butane to 100 parts by weight of resin. Extruder 2 was heated by an electric heater and the resin temperature at the outlet of extruder 2 was 160° C. From the outlet of extruder 2, resin was extruded into a long-land die 3 having a circular cross section of 21 mm diameter and being 2 m in length. Through lubricant applicator 4, lubricant (Nissan Unilube 75-2620) was fed constantly into the inner surface of the long-land die. The long-land die was heated from the outside using an electric heater so as to gradually increase the temperature along its flow direction up to 175° C. A choking orifice 5 was mounted at the end of long-land die 3 to create back pressure sufficient to dissolve the foaming agent, butane, into the resin. Choking ratio A/B of the orifice 5 was 4/1 and a pressure gauge 17 provided at the end of extruder 2 indicated 70 kg/cm².

Crosslinked resin was extruded from choking orifice 5 to an atmospheric zone continuously to obtain foamed article 10.

Obtained crosslinked, foamed article 10 was a crylindrical rod having a diameter of about 3.8 cm in diameter and a density of 0.060 g/cc and uniform, fine cells smaller than 300 micron. Gel ratio of the material was 35%.

EXAMPLE 6

Using 100 parts by weight of polypropylene (Mitsubishi Petrochemical Co., Noblen FX 4), 0.5 part by weight of crosslinking agent (Nippon Oil & Fats Co., Perbutyl D) and 0.4 part by weight of divinylbenzene as crosslinking accelerator, the same process as described in Example 5 was carried out except that the temperatures of extruder 2 and long-land die 3 were set 25° C. higher than those of Example 5. The crosslinked foam article thus obtained was a cylindrical rod having a diameter of about 3.8 cm, a density of 0.065 g/cc, a 25% gel ratio and uniform, fine cells smaller than 400 micron.

EXAMPLE 7

In this example, a choking orifice 5 at the end of long-land die 3 in FIG. 1 was omitted, and an intermediate choking orifice 8 (not shown in FIG. 1) was provided instead.

Pelletized particles consisting of 100 parts by weight of low density polyethylene (LK 50) and 7 parts by weight of foaming agent (AC#3), together with 1.0 part by weight of crosslinking agent (Percumyl D), were fed into extruder 2 as shown in FIG. 1 which was heated by an electric heater.

Kneaded and heated resin whose temperature was indicated as being 162° C. by thermometer 16 was extruded into long-land die 3 having a circular cross section of 21 mm diameter.

Through lubricant applicator 4, lubricant (Nissan Unilube 75 D-2620) was constantly supplied into the inner surface of the entrance of front or upstream part 6 of long-land die 3. The length of front or upstream part 6 was 3 m. The temperature of front or upstream part 6 was gradually increased along the flow direction of resin up to 175° C.

At the end of front or upstream part 6, an intermediate choking orifice 8 as shown in FIG. 6 having a choking ratio A/B of 5/2 was connected to generate back pressure. Resin at the point of intermediate choking orifice was partially crosslinked so as to lose its flow character. The gel ratio of the resin was 45%. Subsequent to intermediate choking orifice, a rear or downstream part 7 (2.5 m in length) of long-land die was connected. The rear or downstream part 7 was heated up to 202° C. to decompose the foaming agent. In this example a choking orifice at the end of the long-land die was omitted.

Pressure gauge 17 mounted at the outlet of extruder 2 indicated 20 kg/cm². The thus crosslinked and melted resin was continuously extruded and released from the end of the long-land die 3 into an atmospheric zone to produce a foamed article 10.

The crosslinked and foamed article thus obtained was a cylindrical rod having a diameter of 3.8 cm, a density of 0.065 g/cc and having a uniform, fine cellular structure, the cell size being smaller than 200 microns.

What is claimed is:
1. A method of producing a crosslinked foamed article, said method comprising:
   (a) uniformly mixing a crosslinkable thermoplastic resin, a crosslinking agent which has a decomposition temperature higher than the melting point of said resin and a foaming agent which has a decomposition or volatization temperature higher than that of said crosslinking agent and generates a gas upon decomposition or volatization;
   (b) extruding said mixture through a long-land die provided with a heating means and having a front or upstream portion and a rear or downstream portion, the temperature of said rear portion being higher than the temperature of said front or upstream portion, and said long-land die being further provided with a choking orifice at an intermediate portion between said front or upstream portion and said rear or downstream portion and/or at an end portion thereof, said choking orifice creating back pressure in said long-land die and having a choking ratio A/B of from 4/3–10/2, wherein A is the vertical cross-sectional area of said long-land die in front of said orifice and B is the vertical cross-sectional area of the narrowest section of said orifice, and simultaneously supplying a lubricant into an interface between the inner surface of said long-land die and said mixture;

(c) heating said conveyed mixture in said front or upstream portion of said long-land die to a temperature sufficient to cause decomposition of said crosslinking agent and crosslinking of said crosslinkable thermoplastic resin, the degree of crosslinking as defined by gel ratio being at least 5%;

(d) heating the conveyed mixture from step (c) in said rear or downstream portion of said long-land die to a temperature higher than the temperature in said front or upstream portion of the die to cause decomposition or volatization of said foaming agent; and (e) releasing the mixture from step (d) from said long-land die into an atmospheric or controlled pressure zone to allow said mixture to expand and form said foamed article.

2. The method according to claim 1 wherein said choking orifice is provided at an end portion of said long-land die.

3. The method according to claim 1 wherein said choking orifice is provided at an intermediate portion of said long-land die.

4. The method according to claim 1 wherein said choking orifice is provided at an intermediate portion and at an end portion of said long-land die.

5. The method according to claim 1, wherein said thermoplastic resin is a crystalline resin.

6. The method according to claim 1, wherein said thermoplastic resin is a polyolefin.

7. The method according to claim 1, wherein the length of said front or upstream portion of the long-land die is more than 50 cm and the length of said rear or downstream portion is 1/5–2 times the length of the front portion.

8. The method according to claim 7, wherein the length of said front or upstream portion of the long-land die is more than 200 cm.

9. The method according to claim 1, wherein said degree of crosslinking is 10–70%.

10. The method according to claim 1 wherein said choking orifice is provided with passways for cooling water.

11. The method according to any one of claims 2–6 wherein said rear or downstream portion of the long-land die is gradually increased in cross-sectional area along the direction of resin flow.

12. A method for producing a crosslinked foamed article, said method comprising:

(a) uniformly mixing a crosslinkable thermoplastic resin, a crosslinking agent which has a decomposition temperature higher than the melting point of said resin and a foaming agent which has a decomposition temperature higher than that of said crosslinking agent and generates a gas upon decomposition;

(b) extruding said mixture through a long-land die provided with a heating means and having a front or upstream portion having a length of more than 200 cm and a rear or downstream portion having a length of 1/5–2 times the length of said front or upstream portion, the temperature of said rear or downstream portion being higher than the temperature of said front or upstream portion, and said long-land die being further provided with a choking orifice at an intermediate portion between said front or upstream portion and said rear or downstream portion, said choking orifice creating back pressure in said long-land die and having a choking ratio A/B of from 10/7–10/2, wherein A is the vertical cross-sectional area of said long-land die in front of said orifice and B is the vertical cross-sectional area of the narrowest section of said orifice, and simultaneously supplying a lubricant into an interface between the inner surface of said long-land die and said mixture;

(c) heating said conveyed mixture in said front or upstream portion of said long-land die to a temperature sufficient to cause decomposition of said crosslinking agent and crosslinking of said crosslinkable thermoplastic resin, the degree of crosslinking as defined by gel ratio being 10–70%;

(d) heating the mixture from step (c) in said rear or downstream portion of said long-land die to a temperature higher then the temperature in said front or upstream part of the die to cause decomposition of said foaming agent; and (e) releasing the mixture from step (d) from said long-land die into an atmospheric or controlled pressure zone to allow said mixture to expand and form said foamed article.

13. The method according to claim 12, wherein said thermoplastic resin is a crystalline resin.

14. The method according to claim 12, wherein said thermoplastic resin is a polyolefin.

15. The method according to claim 12, wherein said choking orifice is provided with passways for cooling water.

16. The method according to any one of claims 12–15, wherein said rear or downstream portion of the long-land die is gradually increased in cross-sectional area along the direction of resin flow.

* * * * *